United States Patent [19]

Booher

[11] 4,044,899
[45] Aug. 30, 1977

[54] HORIZONTALLY DISCHARGING SEMI-TRAILER

[75] Inventor: Howard Booher, Randolph, Ohio

[73] Assignees: Robert J. Bruce, New Castle, Pa.; Mark T. Tate, Atwater, Ohio ; part interest to each

[21] Appl. No.: 693,639

[22] Filed: June 7, 1976

[51] Int. Cl.² .............................................. B60D 1/00
[52] U.S. Cl. ...................................... 214/82; 214/83.3
[58] Field of Search ............... 214/82, 833; 296/28 M, 296/28 R, 28 D; 280/106

[56] References Cited

U.S. PATENT DOCUMENTS

| 2,856,086 | 10/1958 | Balbi | 214/82 |
| 3,091,493 | 5/1963 | Rivers | 296/28 M |
| 3,273,728 | 9/1966 | Kelso | 100/245 |
| 3,953,170 | 4/1976 | Webb | 214/82 |

Primary Examiner—Robert J. Spar
Assistant Examiner—Lawrence E. Williams
Attorney, Agent, or Firm—Webster B. Harpman

[57] ABSTRACT

A horizontally discharging semi-trailer is formed with a body structure capable of resisting distortion from loads and the operation of a longitudinally movable pusher plate arranged to move the contents of the semi-trailer horizontally so as to discharge the same therefrom.

7 Claims, 3 Drawing Figures

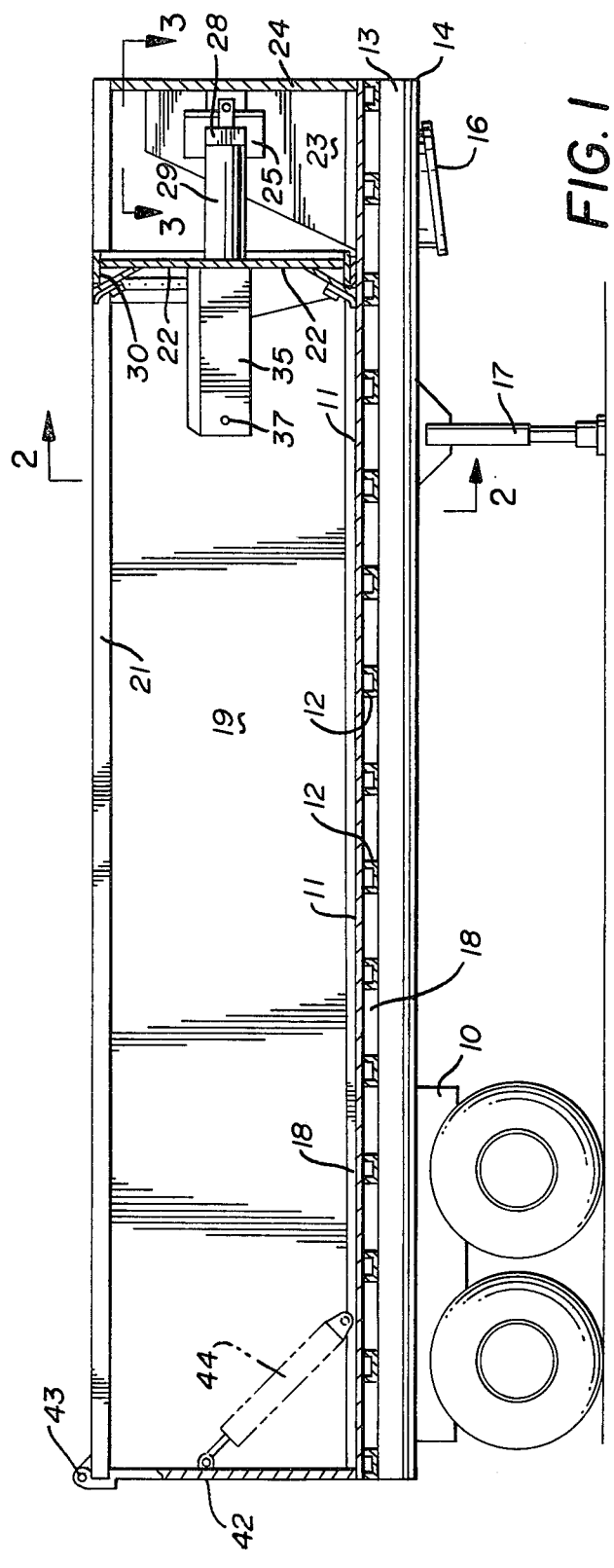
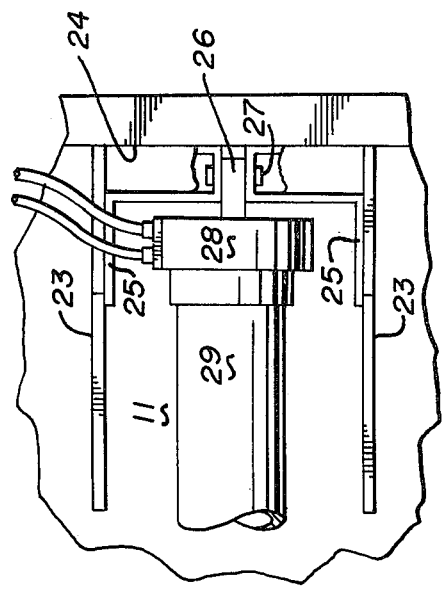
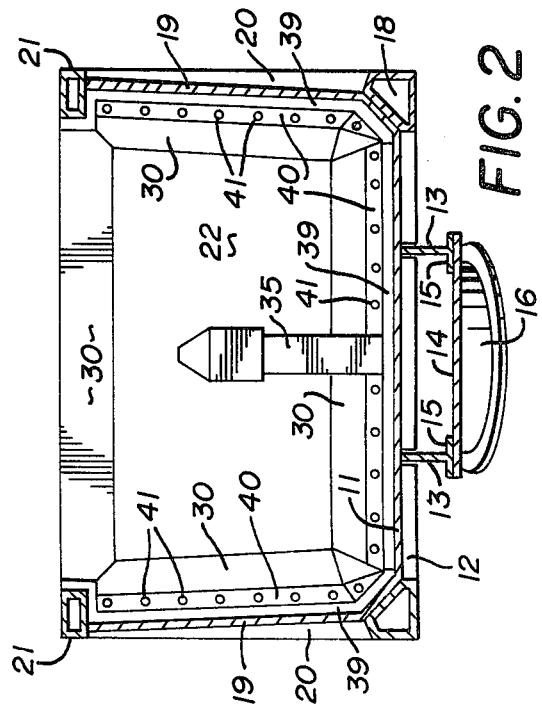

HORIZONTALLY DISCHARGING SEMI-TRAILER

BACKGROUND OF THE INVENTION

1. Field of the Invention

This invention relates to semi-trailers as used in the over-the-road hauling of bulk materials such as coal, limestone, blast furnace slag, concrete aggregates and blacktop paving materials.

2. Description of the Prior Art

Prior structures of this type have comprised open top semi-trailer vehicles with floor and wall constructions designed to support the weight of the material therein and have been provided with hydraulic rams for moving a pusher plate longitudinally thereof. (See U.S. Pat. Nos. 3,815,764, 3,273,728, 3,175,708 and 2,856,086.)

This invention relates to an improvement in the structure of horizontally discharging semi-trailers provided with pusher plates and hydraulic rams for moving the same therein.

SUMMARY OF THE INVENTION

A horizontally discharging semi-trailer comprises an open top elongated semi-trailer with a combination floor frame and side wall structure formed of welded aluminum components shaped and arraged to form a relatively lightweight rigid semi-trailer body which will confine a longitudinally movable pusher plate therein to a predetermined longitudinal path.

DESCRIPTION OF THE DRAWINGS

FIG. 1 is a vertical section of a horizontally discharging semi-trailer embodying the present invention;

FIG. 2 is a vertical section on line 2—2 of FIG. 1; and

FIG. 3 is an enlarged fragmentary sectional view on line 3—3 of FIG. 1.

DESCRIPTION OF THE PREFERRED EMBODIMENT

In the form chosen for illustration herein the invention comprises an over-the-road semi-trailer in which a ground engaging wheel axle and spring suspension unit 10 is postioned under and attached to one end of a combinatin floor and frame in which a floor 11 is supported on a plurality of transversely positioned longitudinally spaced U-shaped channel members 12. A pair of transversely spaced longitudinally extending beams 13 are notched along their upper edges so as to register with the longitudinally spaced channel members 12 and the channel members 12 and the beams 13 are continuously welded to one another throughout their areas of contact.

A reinforcing plate 14 is secured to flanges 15 on the lower ends of the beams 13 to form a rigid box-like frame therewith that extends along the beams and throughout their length. The wheel carrying assembly 10 is secured to the plate 14 and a fifth wheel 16 is attached thereto adjacent the opposite end of the semi-trailer. A pair of retractrable supports 17 are pivotally secured to the plate 14 so that the semit-trailer canbe supported thereby when the fifth wheel 16 thereof is not engaged on a tractor or the like as will be understood by those skilled in the art.

The longitudinal edges of the floor 11 are arranged on upwardly and outwardly angular planes and supported by secondary longitudinally extendng box frames 18, the innermost portions of which are joined to the opposite ends of the channel members 12. Side walls 19 extend upwardly on a slight outward angle and are held in this desirable position by a plurality of longitudinally spaced vertically standing tapered channels 20 which are continuously welded thereto along their meeting edges. The upper longitudinal edges of the side walls 19 and the upper ends of the tapered channels 20 are attached to longitudinally extending box rails 21, the inner opposed edges of which extend inwardly of the inner surfaces of the side walls 19 so as to form guides as well as reinforcing members.

The semi-trailer body thus comprises an unusually sturdy and rigid structure in which the floor 11, the channel members 12, the beams 13 and the plate 14 cooperate with the box frames 18 to form an unusually rigid platform and wherein the outwardly angled side walls 19, the reinforcingg tapered channels 20 and the box rails 21 form substantially vertically oppositely disposed sides continuing the unusuallyrigid structure of the floor components. When a pusher plate such as 22 as seen in FIGS. 1 and 2 of the drawings is positioned in the area between the side walls 19 and on the floor 11 and provided with matching configurations at its upper outer corners engaged beneath the inner portions of the box rails 21 and means is provided for moving the pusher plate longitudinally of the semi-trailer body, a horizontally discharging semi-trailer of unusual structural characteristics results.

By referring now to FIGS. 1 and 3 of the drawings, it will be seen that a pair of vertically standing support members 23 are positioned on the floor 11 directly above the beams 13 and adjacent a front wall 24 of the semi-trailer body. The engaging edges of the support members 23 are continuously welded to the floor 11 and front wall 24. A pair of inwardly extending brackets 25 are secured to the inner surfaces of the support members 23 and provide for the reception of a cylinder mounting 26 which is secured between the innermost portions of the brackets 25 by a fastener 27. The cylinder mounting 26 is part of a cylinder end 28 to which one end of a double acting multiple section telescopic hydraulic ram 29 is engaged and through which appropriate hydraulic fluid supply lines extend as will be understood by those skilled in the art.

The introduction of hydraulic fluid under pressure by way of the fluid lines into the double acting hydraulic ram 29 will cause the pusher plate 22 to move longitudinally of the semi-trailer body toward and away from the end 24 thereof.

It will occur to those skilled in the art that the construction of the substantially vertically standing walls including the box frames 18, the wall plates 19, the box rails 21 and the tapered channel 20 extending between the box rails 21 and box frames 18 form rigid truss-like members.

By referring now to FIGS. 1 and 2 of the drawings, it will be seen that the pusher plate 22 is reinforced by an edge frame 30 which includes angularly disposed flanges 31 extending radially outwardly from the face of the pusher plate 22 together with a plurality of radially positioned reinforcing channels 32 positioned on the opposite or back side of the pusher plate 22 and extending to a central opening 33 through which the telescopic hydraulic ram 29 extends. The opening 33 in the pusher plate 22 is defined by a collar 34 and a box-like enclosure formed of heavy structural components is positioned on the face of the pusher plate 22 to enclose the portion of the ram 29 which extends therethrough. The forward end of the ram 29 has a cylinder closure 36 thereon and the same engages the closure 35 and is fastened thereto as by a fastener 37. The lowermost portion of the edge frame 30 of the pusher plate 22 is provided with a plastic bearing strip 38 on which is slides along the floor 11 of the semi-trailer. The bottom and side flanges 21 on the pusher plate 22 are provided with plastic wiper strips 39 which are clampingly secured thereto by clamping strips 40, the assembly being secured to the flanges 31 by a plurality of counter sunk bolts 41.

By referring now to FIG. 2 of the drawings, it will be seen that the pusher plate 22 has a central relatively large substantially vertical flat surface with its peripheral edges defined by the angularly disposed radially extending flanges 30 so that material engaged thereby as in being moved by the pusher plate 22 longitudinally of the semi-trailer and out of the tailgate end thereof will tend to center and hold the pusher plate 22 by reason of its configuration. It will also be seen that the boxed rails 21 and their inner opposed edges overlie portions of the edge frame 30 of the pusher plate 22 and that the plastic wiper strips 39 extend into these areas to provide friction bearings in addition to the wiping action against the outwardly and upwardly tapered side walls 19 of the semi-trailer body.

By referring now to the left end of the FIG. 1 of the drawings, it will be seen that a tailgate 42 is pivoted at its upper ends by pivots 43 to the rearmost end of the semi-trailer body so that it will swing outwardly in an opening action and that broken lines in FIG. 1 indicate the presence of a hydraulic piston and cylinder assembly 44 which is preferably provided to automatically open the tailgate 42 when the pusher plate 22 is actuated to discharge the contents of the semi-trailer horizontally.

It will thus be seen that a horizontally discharging semi-trailer has been disclosed as comprising a unique semi-trailer bodyhaving smooth inner floor and walls facilitating the sliding action of a pusher plate with wiping edges moved longitudinally thereof. The beams 13, transverse U-shaped channels 12, heavy floor plates 11, and the box frames 18 together with the outwardly inclined side walls 19 and their tapered channels 20 form an unusual rigid non-sagging structure particularly suitable for the operation of pusher plate and its actuating mechanism.

Although but one embodiment of the present invention has been illustrated and described, it will be apparent to those skilled in the art that various changes and modifications may be made therein without departing from the spirit of the invention and having thus described our invention what we claim is:

1. In a horizontally discharging semi-trailer having an elongated body with a discharge opening in one end and a movable pusher plate and means for moving the same normally positioned in the opposite end, said elongated body having a smooth floor and smooth inner side walls; said floor comprising a floor plate, a plurality of longitudinally spaced transversely positioned reinforcing members secured to the underside thereof, longitudinally extending frame members secured to the longitudinal sides of said floor plate and reinforcing members, a pair of transversely spaced longitudinally extending beams having notches therein registering with said reinforcing members and secured thereto and to said floor plate and a secondary plate positioned between said beams and secured to the bottoms thereof, the side walls of said elongated body comprising substantially vertically standing wall plates attached to and extending upwardly from said longitudinally extending frame members, rails positioned on the upper longitudinal edges of said wall plates and a plurality of longitudinally spaced vertically standing tapered secondary reinforcing members secured to the outer surfaces of said wall plates and attached at their upper and lower ends to said rails and frame members respectively so that said side walls form rigid truss-like members continuously engaged on and supporting said floor therebetween.

2. The improvement in a horizontally discharging semi-trailer set forth in claim 1 wherein said longitudinally spaced transversely positioned reinforcing members are U-shaped channels secured to the underside of the floor plate by being welded thereto.

3. The improvement in a horizontally discharging semi-trailer set forth in claim 1 and wherein said longitudinally extending frame members secured to the longitudinal sides of said floor plate comprise box frames welded to the longitudinal edges of said floor plate and said reinforcing members.

4. The improvement in a horixontally discharging semi-trailer set forth in claim 1 and wherein said longitudinally extending frame members are box frames and their inner opposed surfaces are angularly disposed with respect to said floor plate.

5. The improvement in a horizontally discharging semi-trailer set forth in claim 1 and wherein said notched beams are secured to said reinforcing members and said floor plate by welding the same thereto.

6. The improvement in a horizontally discharging semi-trailer set forth in claim 1 and wherein said rails positioned on the upper longitudinal edges of said wall plates are box rails having oppositely disposed portions extending inwardly of the wall plates and wherein said pusher plate is notched on its upper outer corners for registry with said box rails so as to be restrained against upward movement thereby.

7. The improvement in a horizontally discharging semi-trailer set forth in claim 1 and wherein said secondary reinforcing members are semi V-shpaed channels welded to the outer surfaces of said wall plates and welded at their upper and lower ends respectively to said rails and frame members respectivley.

* * * * *